J. M. HANNAHS.

Elevated-Railways.

No. 6,150.

Reissued Nov. 24, 1874.

WITNESSES:

P. C. Dieterich

H. C. Scott

INVENTOR:

James M. Hannahs per C. H. Watson & Co

ATTORNEYS

J. M. HANNAHS.

Elevated-Railways.

No. 6,150.

Reissued Nov. 24, 1874.

WITNESSES:

P. C. Dieterich

H. C. Scott.

INVENTOR:

James M. Hannahs.

per C. H. Watson & Co

ATTORNEYS.

J. M. HANNAHS.

Elevated-Railways.

No. 6,150.

Reissued Nov. 24, 1874.

WITNESSES:
P. C. Dieterich
M. A. Scott

INVENTOR:
James M. Hannahs per C. H. Watson & Co.
ATTORNEYS.

J. M. HANNAHS.

Elevated-Railways.

No. 6,150.

Reissued Nov. 24, 1874.

WITNESSES:

P. C. Dieterich

H. C. B. Scott

INVENTOR:

James M. Hannahs per:

C. H. Watson & Co

ATTORNEYS.

J. M. HANNAHS.
Elevated-Railways.
No. 6,150.
Reissued Nov. 24, 1874.
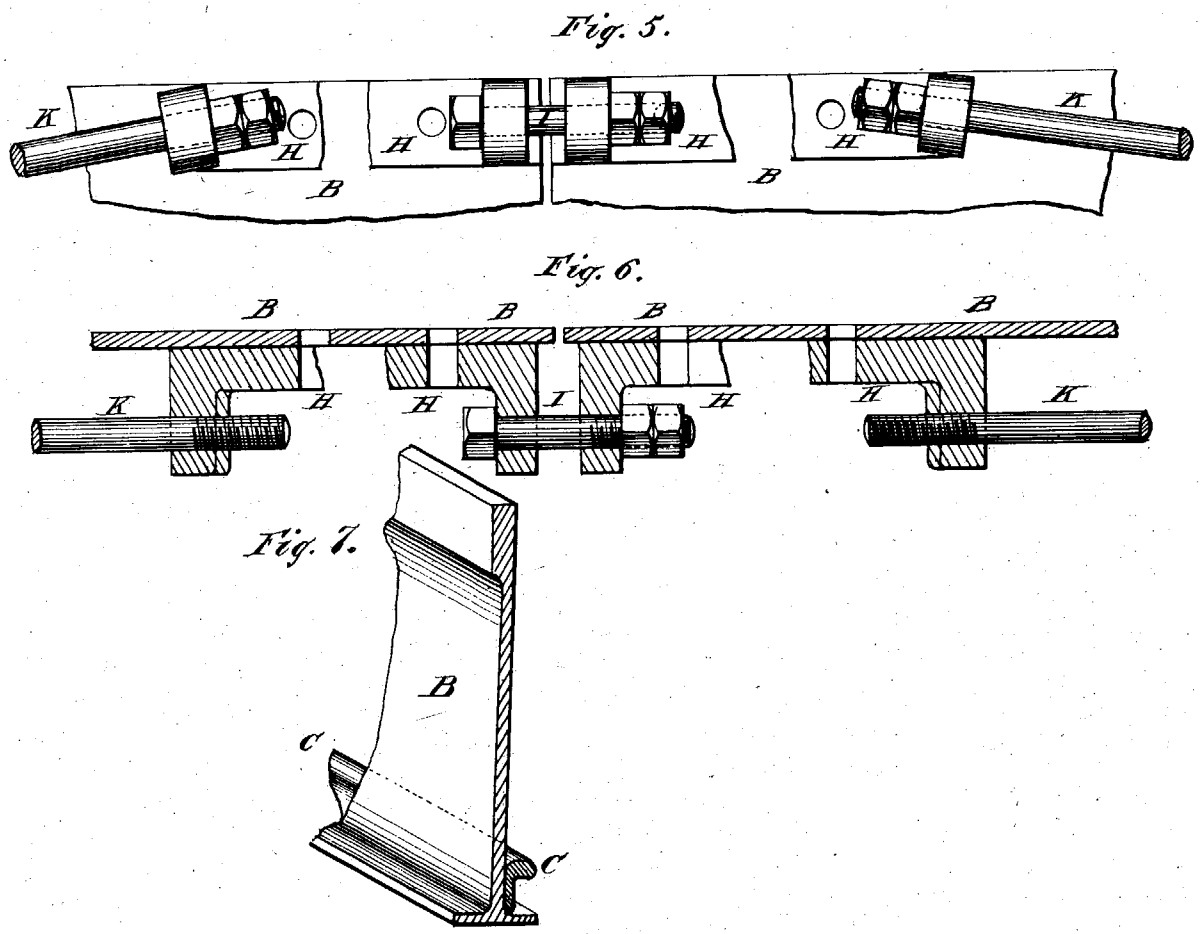
WITNESSES:
P. C. Dieterich.
H. C. Scott.
INVENTOR:
James M. Hannahs
per.
C. H. Watson & Co.
ATTORNEYS.

UNITED STATES PATENT OFFICE.

JAMES M. HANNAHS, OF CHICAGO, ILLINOIS, ASSIGNOR OF ONE-HALF INTEREST TO LOUIS WAHL AND CHRISTIAN WAHL.

IMPROVEMENT IN ELEVATED RAILWAYS.

Specification forming part of Letters Patent No. 106,056, dated August 2, 1870; reissue No. 6,150, dated November 24, 1874; application filed October 23, 1874.

*To all whom it may concern:*

Be it known that I, JAMES M. HANNAHS, of Chicago, in the county of Cook and State of Illinois, have invented certain Improvements in Elevated Railways, of which the following is a specification, reference being had to the accompanying drawings, in which—

Figure 1:
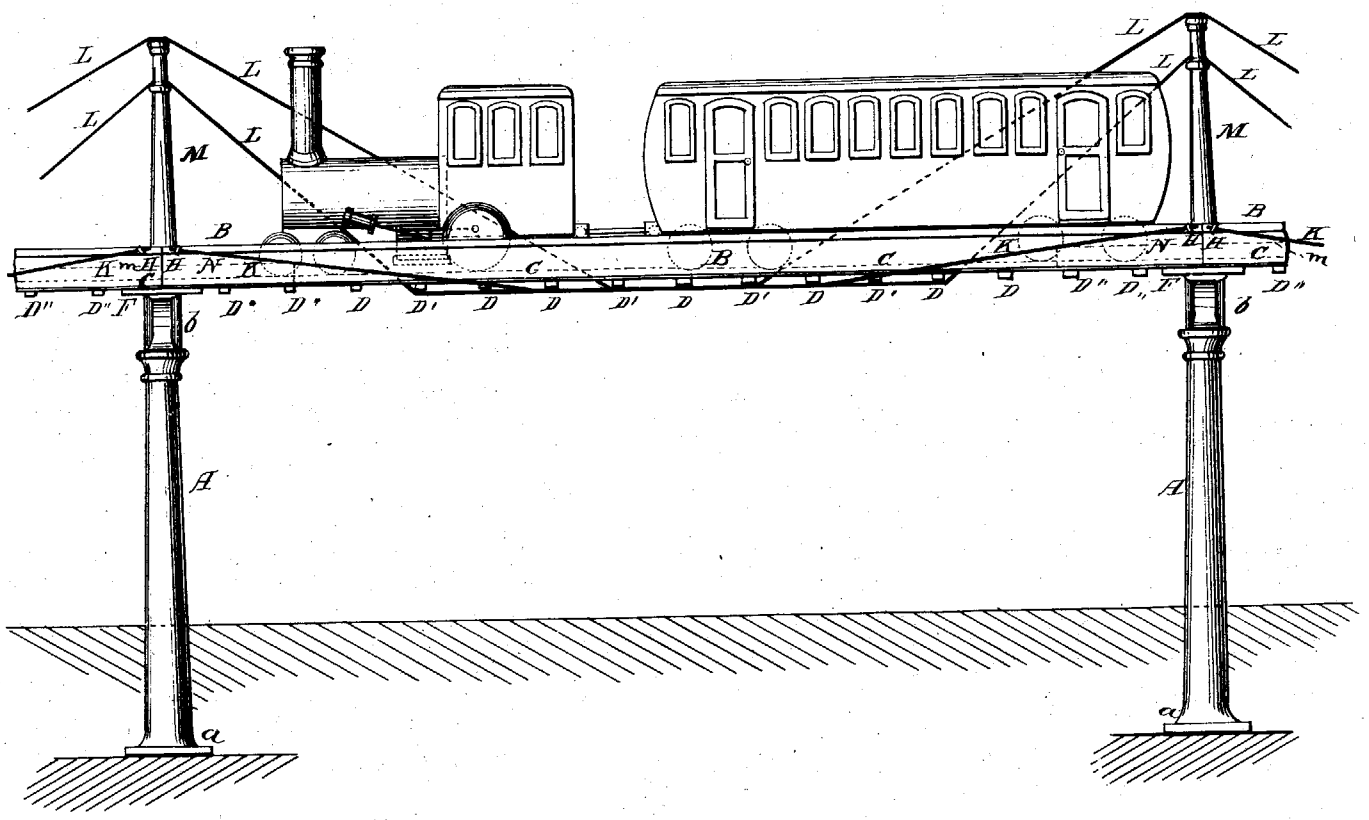
Figure 2:
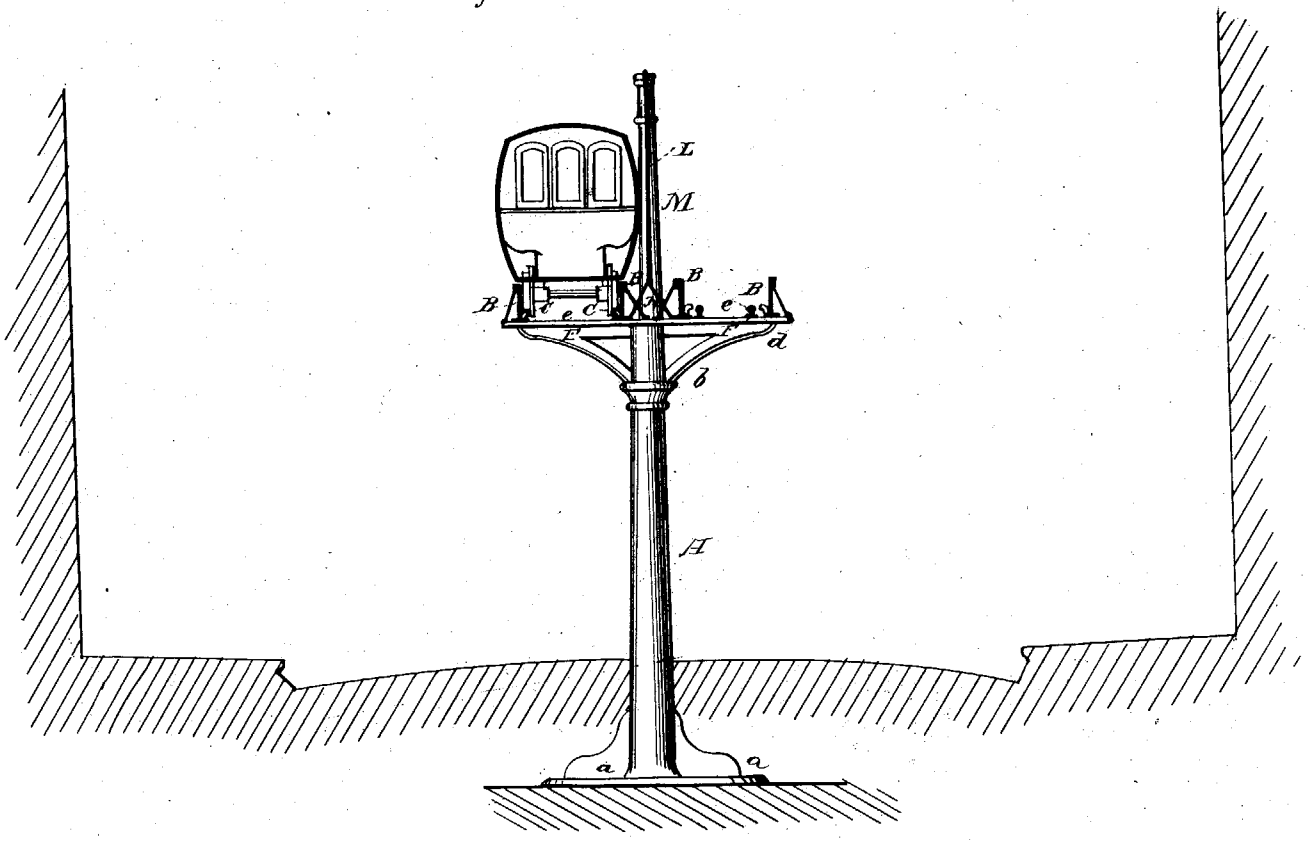
Figure 3:
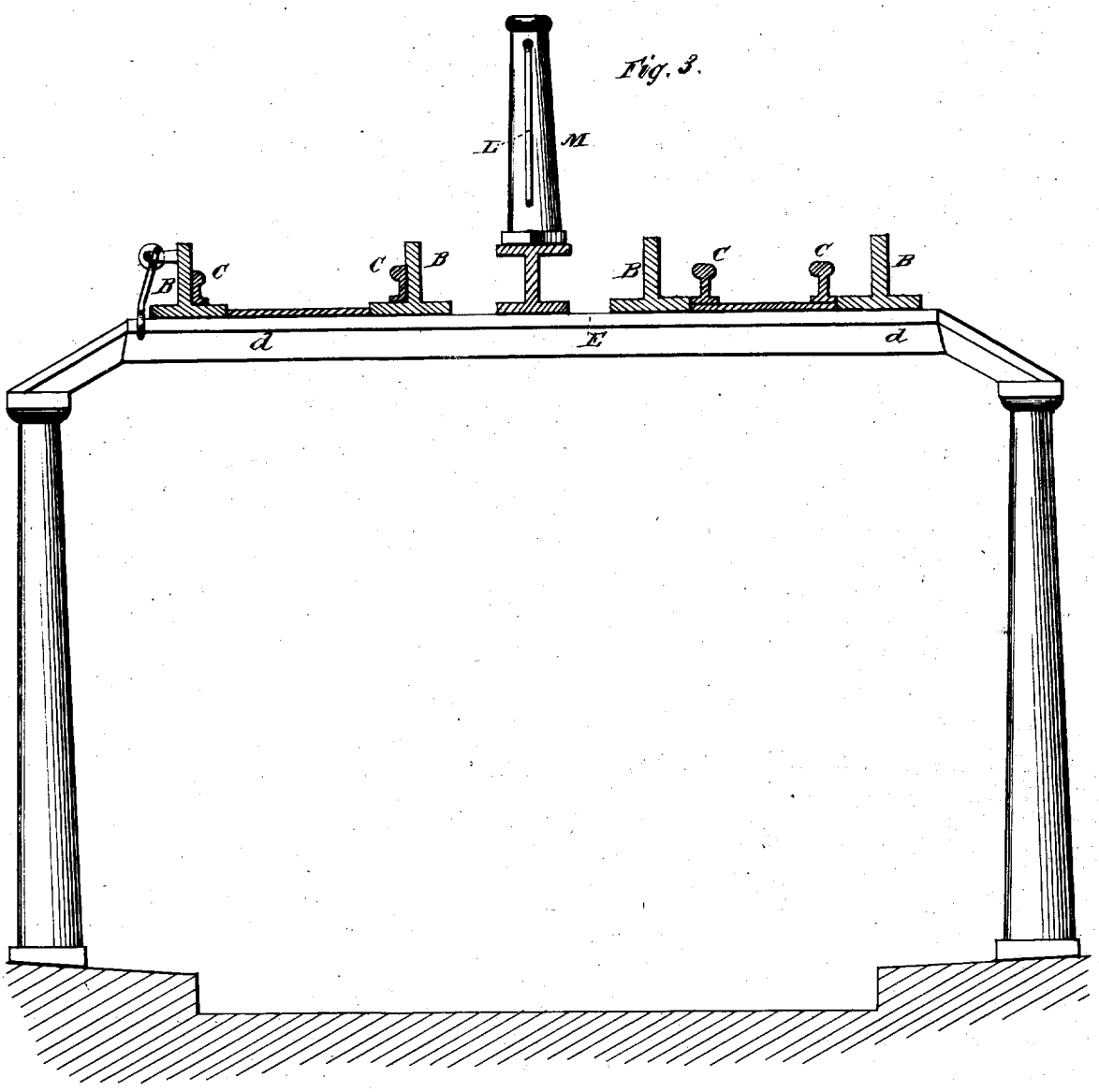
Figure 4:
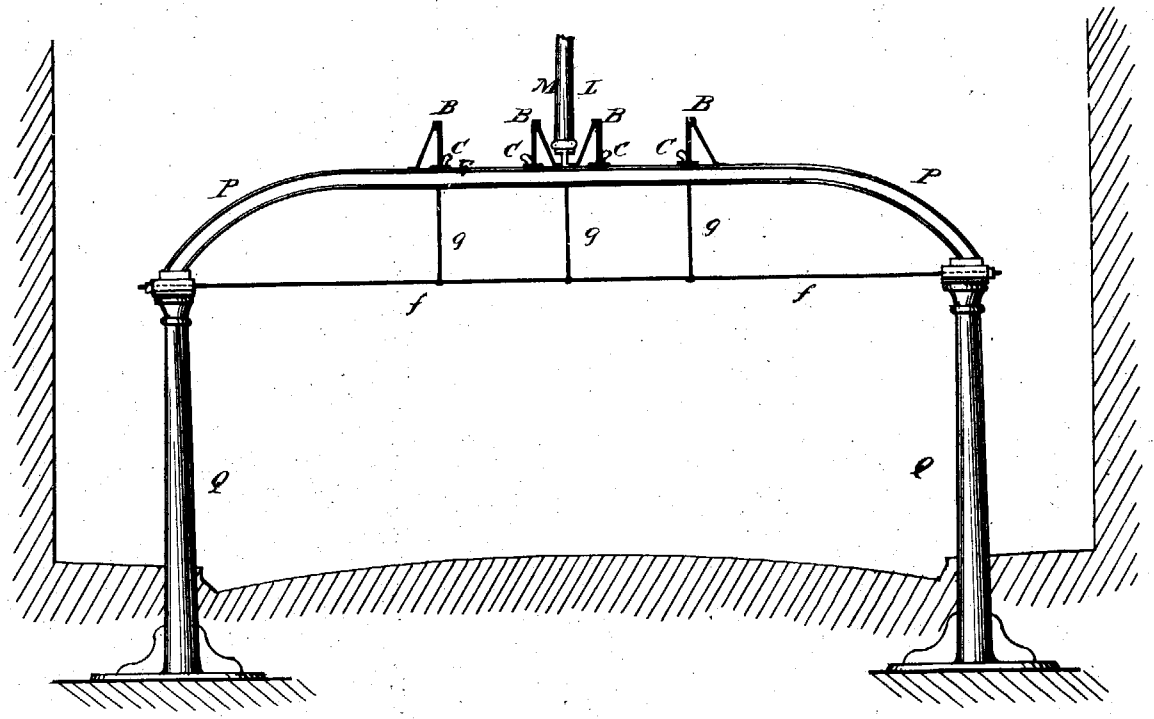

Figure 1 is a side elevation, mounted on a series of single columns; Fig. 2, an end view of the same; Fig. 3, an end view, showing the ways elevated; Fig. 4, an end view, mounted on two rows of columns; and Figs. 5, 6, and 7 are views of parts detached.

My invention relates to elevated railways for cities, towns, parks, and like places; and consists of broad parallel girders, constructed, arranged, and supported, in connection with a railway-track, in a novel manner, upon a single or double row of columns, to form an inclosure for the track and cars, as hereinafter explained.

In the drawings, A represents the metallic supporting-columns; B, the girders; C, the rails; D D′ D″, cross-bars; E, floor or stringers; F, metallic cross-plates on arms of supporting-posts; H, flanged plates or angle-irons riveted to the girders; I, bolts for securing the girder-sections together; K, truss-rods; L, tension-rods or cables; M, columns; N, bolsters; P, arched girder; *a*, base of supporting-columns; *b*, braces for side arms of columns.

In the construction of this railway metallic columns A, made of suitable size and strength, with a broad base, are placed on a stone or other suitable foundation. When a single central row is used each column is provided with horizontal arms *d*, extending at right angles to the line of the columns, and at a proper height from the street, so as not to be an obstruction. They are made strong, and may be further strengthened by braces *b*, as shown, and are long enough to support a railway-track on each side of the columns. On each of these arms there are fastened plates F, by bolts or in any secure manner, and upon them are arranged two parallel lines of girders, B B, with their ends meeting on the plates, and firmly secured to them. These girders have broad flanges on their under sides, and project upward nearly to the top of the car-wheels, as shown in Fig. 1, and they are placed far enough apart to form an iron inclosure for a railway. These girders are also connected together by cross-bars D, which are placed at a proper distance apart to support a floor or the track.

In one form of the track the rails are bolted to the inner sides of the girders with a flange turned inward, as shown at Figs. 2 and 7, and in the form shown at Figs. 2 and 3 the rails are bolted or spiked to the arms and cross-bars near the base-flange of the girders. To support and strengthen these girders when made of light material, I make a suspension-truss as follows: Connecting-plates H H, provided with flanges turned up, are bolted to the upper edge at the ends of each girder, as shown in Figs. 1, 5, and 6. They are drawn together by the bolts I, and these bolts, when tightened, serve to connect the girders firmly, so as to form a continuous rigid line. The plates on the two ends of each girder are then connected by truss-rods K, passing under the cross-bars D, and arranged as shown in Fig. 1. These rods may be tightened by any ordinary or suitable means. As the girders are rigidly connected by the plates H, it will be seen that if one of the truss-rods breaks the girder which it is mainly designed to support will still be held securely at its ends by means of its connection, through the plates H H, with the next girder and truss-rod. Or, should a girder be broken or disconnected from the plates H, it would still be upheld by the truss-rods acting as suspension-cables. These girders may also be further supported by tension-rods or cables L L, stretched from or near the tops of the columns M, which rise above the main columns A, to cross-bars D′ under the girders, as shown at Fig. 1. The girders may be further supported by bolsters NN, resting on, or supported on, the main column A, and extending on either side at right angles to it, and parallel with the girders, as shown by the dotted lines *m*, Fig. 1. These bolsters have cross-bars D″ bolted to the under sides of their ends, so as to extend under the main girders.

As the rails on which the cars run are placed next to or near the inner sides of the girders, it is obvious that these upward-projecting girders, besides furnishing the immediate support of the railway, will also, by reason of their high sides, form an iron inclosure, which will prevent the cars from running off on either side, and form a guard or guide to keep the cars on the track, as the cars are made to fit into the inclosure as closely as they can be and avoid rubbing against the girders.

When desired for use in narrow streets, two rows of columns may be arranged as shown in Fig. 4. In this case they are placed along the outer edge of the opposite sidewalks, the columns opposite to each other being connected by an arched girder, P, and chord *f*, connected with suitable tie-rods *g*, as shown in Fig. 4. The girders B B and track are arranged on these arches substantially the same as when arranged on the side arms of single columns.

What I claim as new, and desire to secure by Letters Patent, is—

1. The upward-projecting girders B B, supported upon elevating posts or arches, in combination with the rails C, and arranged to form an inclosure to guard and support the cars, and prevent them from running off, substantially as specified.

2. An elevated railway mounted on a single column, or double row of columns, and consisting of the trussed girders B B, with the rail C attached, when constructed and arranged substantially as herein described.

3. In combination with girders B B, connecting-plates HH and the truss-rods K K, when constructed and arranged substantially as herein described, and for the purpose set forth.

JAMES M. HANNAHS.

Witnesses:
L. L. BOND,
O. W. BOND.